3,118,832
CONTROL OF SILT LOAD AND SCOURING IN
FLOWING STREAMS
Melvin F. Katzer, Danville, and David J. Pye, Walnut
Creek, Calif., assignors to The Dow Chemical Company, Midland, Mich., a corporation of Delaware
No Drawing. Filed June 22, 1959, Ser. No. 821,639
5 Claims. (Cl. 210—54)

This invention is concerned with hydraulic engineering and is particularly directed to a method for controlling the silt load and for influencing the scouring and deposition characteristics of flowing streams.

Since earliest recorded history, man has been concerned with the vagaries of streams and rivers, particularly those streams which carry a heavy silt load during all or part of the year. Such streams are subject to considerable changes in the stream bed as a result of scouring and redeposition which may lead to undesirable bar formation, meandering and the formation of new channels. Numerous devices such as jetties, levees, check dams and the like have been employed to provide partial or temporary alleviation of the aforementioned problems. However, such installations are expensive and not readily portable.

It is an object of the present invention to provide a novel method for controlling the silt load, scouring and deposition characteristics of flowing streams. It is a further object to provide such a method wherein the apparatus employed is readily portable and can be put into operation wherever needed as the bed and characteristics of the stream change with time. Yet another object is to provide such a method embodying a chemical treatment of the flowing stream under predetermined conditions. Other objects will become apparent from the following specification and claims.

In accordance with the present invention it has been found possible to achieve the above and related objects by introducing a flocculant into a stream of turbid water in an area of turbulent flow at a preselected distance upstream from a desired site of deposition. In a further embodiment of the invention the flocculant is applied to a normally nonturbulent body of water and the required turbulence is obtained by the action of natural forces, such as the wind, or by mechanical means, as by introducing the flocculant into the slipstream of a power boat. It is among the advantages of the invention that by proceeding in the abovedescribed manner, silt deposition can be caused to take place in a desired location, while, at the same time, encouraging scouring at another location where the latter is desired. The application of the method of the invention can be controlled to accomplish the build-up of a river valley by encouraging deposition and meandering. Alternatively, by proper preselection of the treating sites, the same method may be employed to encourage scouring and deepening of stream and river channels.

The flocculants employed in the present invention are water-soluble, high-molecular-weight, synthetic organic polymers containing a plurality of polar groups along the polymer chain. Suitable polar groups in such compounds include amido, carboxyl, sulfonate, sulfonium, amino and quaternary ammonium groups. Typical polymers suitable for use in accordance with the invention include polyacrylic acid and its water-soluble salts, polyacrylamide, copolymers of acrylamide with vinyl acetate, methacrylamide, acrylic acid, methacrylic acid, dimethylaminoethyl acrylate, vinylbenzenesulfonic acid, vinyltoluenesulfonic acid, vinylbenzyl trialkylammonium hydroxide and the like and the water-soluble salts thereof. Other suitable polymers are poly-vinylbenzenesulfonic acid and its salts, sulfonated polyvinyltoluene, polyvinylbenzyl trialkylammonium salts, poly-2-aminoethyl methacrylate salts and the like. A further class of suitable polymers includes copolymers of maleic anhydride with monoethylenically unsaturated compounds such as copolymers of maleic anhydride with vinyl acetate, propylene, butylene and the like. The copolymers of maleic anhydride with other monoethylenically unsaturated compounds are preferably employed in the form of their water-soluble salts which may be obtained by reacting the copolymer with a suitable metal hydroxide. Alternatively, said copolymers of maleic anhydride can be reacted with ammonia to form the half amide for use in the invention.

In carrying out the invention, the flocculant is distributed in any suitable fashion in a turbulent area of the body of turbid water from which deposition of solids is desired. In one mode of operation the flocculant is dissolved in water and the solution is distributed in the turbulent area. Alternatively, the dry, finely divided flocculant is applied as a dust or powder to the surface of the stream. The most satisfactory results are obtained when the flocculant or the solution thereof is applied so as to be quickly and thoroughly mixed with the turbid water. For this reason, the use of a solution of the flocculant is preferred and it has been found desirable to use a dilute solution, for example, a solution containing from about 0.01 to 0.05 percent by weight of the flocculant. With solutions of this concentration, a network of nozzles above the surface of the stream, or even in the stream itself, serves to distribute the solution. Any mechanical means that distributes the dry, solid flocculant evenly over the surface of the stream is satisfactory.

In such operations it is essential that the polymer flocculant be applied in an area where the water is turbulent and means should be provided to subject the treated body of water to agitation, as with artificial obstructions, baffles, pumps, natural falls or rock structures and the like in the area where the flocculant is added. The degree of agitation required is that which will bring the flocculant in contact with the solids in the water. After the initial rapid mixing, it is desirable that a moderate degree of turbulence be maintained to permit the build-up of floc particles to maximum size. Following such build-up of the particles excessive agitation or turbulence is to be avoided since shearing forces at this stage of the process will cause degradation of the floc particles. In practice, the proper sequence of strong turbulence and moderate turbulence followed by a region of decreased turbulence or quiet flow can readily be selected in any particular stream. Alternatively, suitable temporary or permanent checks, dams, baffles or the like can be placed in the stream to produce the desired conditions.

The quantity of flocculant used will depend on the nature of the flocculant and of the solids being treated. As little as 0.001 pound of flocculant for each ton of solids is effective in some cases and there is little advantage in using more than 20 pounds of flocculant per ton of solids. In general, good results are obtained when employing from about 0.01 to 1 pound of flocculant per ton of suspended solid in the water. Selection of the flocculant most effective for a particular type of solid and of the amount of flocculant to employ for best results may be determined readily for any particular body of water by jar tests in which representative polymers of the invention are mixed with the water containing suspended solids from said body of water. The rates of floc formation and sedimentation serve as guides to the choice of the proper flocculant and the optimum dosage thereof.

Following addition of the flocculant and the provision of conditions of turbulence of sufficient degree and duration to form maximum-sized flocs, the solids will settle to the bottom in a region of quiet flow. In streams flowing at the rate of 0.7 to 1.5 linear feet per second settling of the flocs will be nearly complete within about 0.5–1.0 mile down stream. In slower moving streams as in the reservoir behind a dam or in sedimentation basins, the flocs will settle almost immediately. Proper selection of the point of addition of the flocculant enables a user of this invention to deposit essentially all of the solids in a stream at a point selected in advance. In the case of reservoirs or sedimentation basins, that is, places where the application of the flocculant and deposition of the solid will be more or less permanent, it may be desirable to set up permanent means for removal of the flocculated solids. These means include mechanical removal equipment or facilities for sluicing the solids away. Some applications of flocculants, however, will be for limited periods of time until a definite objective is achieved, that is, removal of solids from a certain portion of a stream's course or the building up of a certain location in the bed of the stream.

The following examples illustrate specific embodiments of the invention but are not to be construed as limiting the same.

*Example 1*

A plastic flume was constructed with a length of 6 feet and an inside width of 6 inches. The ends of the flume were semi-circular and a strip of plastic 5.5 feet long was placed in the center of the flume to produce an endless channel approximately 12 feet long. The flume was equipped on one side of the dividing strip with a motor-driven, 5-bladed paddle which when operated caused water in the flume to flow continuously around the channel at a controllable rate.

Natural silt from the Rio Grande River was suspended in water which contained substantially the same amount of dissolved impurities as Rio Grande River water to produce a suspension containing 1.5 percent by weight of suspended solids. The resulting suspension was placed in the abovedescribed flume and circulated therein for 1 hour at a flow rate of 1.5 linear feet per second. At the end of the 1 hour period, the flow rate was reduced to 0.7 feet per second and maintained at such rate for a period of 20 minutes. At the end of this period a portion of the water was withdrawn and the solids content thereof determined by weighing the residue after evaporating to dryness. It was found that natural settling of the solids had reduced the suspended solids content to 0.5 percent by weight.

The above procedure was repeated except that an aqueous solution containing 0.04 percent by weight of a polyacrylamide was added portionwise to the suspension while the flume was operating until 0.065 pound of polyacrylamide had been added per ton of suspended solids in the water. The polymer solution was added in the turbulent zone immediately downstream from the paddle wheel. Circulation of the suspension in the flume was continued for 20 minutes after the completion of the addition of the polyacrylamide and a sample of the water was then withdrawn and the solids content determined gravimetrically as above. It was found that following this treatment the water contained only 0.01 percent by weight of suspended solids. The polyacrylamide employed in the above determination had 7 percent of its amide groups hydrolyzed to sodium carboxylate groups and was characterized by a viscosity of 6 centipoises for a 0.5 percent by weight solution thereof in water at a pH of 3.5 and a temperature of 25° C.

*Example 2*

The second operation of Example 1 was repeated employing a hydrolyzed polyacrylamide instead of the polyacrylamide of said example. The hydrolyzed polyacrylamide was prepared by reacting a solution of the polyacrylamide of Example 1 with sodium hydroxide and had about 38 percent of its amide groups hydrolyzed to sodium carboxylate groups. This agent was added to the suspension in the flume in an amount to provide 0.03 pound of said agent per ton of suspended solids and was added in the form of a dilute aqueous solution containing 0.04 percent by weight of agent. After 10 minutes' circulation in the flume the treated suspension contained 0.1 percent by weight of suspended solids and after 20 minutes' circulation only 0.04 percent by weight of suspended solids. The untreated suspension still contained 0.54 percent by weight of suspended solids after 20 minutes' circulation.

*Example 3*

A straight flume was designed to provide a smooth flow of water at a constant rate. In the upstream half of this flume silt was deposited by treating a slurry of Rio Grande River silt with a mixture of equal parts of the polymers of Examples 1 and 2. A dilute aqueous solution of the polymers was added to the slurry with agitation, in amount to provide 0.037 pound of polymer per ton of suspended solids. The slurry was poured into about 3 inches of water in the flume and the resulting suspension allowed to settle. In the lower half of the flume untreated Rio Grande River silt was deposited by sedimentation in similar fashion. Thereafter a constant stream of water was run through the flume passing over the 2 deposits of silt. The untreated silt was readily resuspended in the moving water. At the time that all of the untreated solids were resuspended by the action of the flowing water, none of the silt solids treated with polyacrylamide and hydrolyzed polyacrylamide had been resuspended in the water.

*Example 4*

Following winter rains a portion of the San Ramon Creek near Alamo, California, for a distance of 3 miles downstream from a check dam was found to have substantially uniform turbidity due to suspended silt solids. The flow from the check dam was estimated at 2,000 gallons per minute. A dilute solution of a partially hydrolyzed polyacrylamide was pumped through garden hoses and sprayed so as to mix with the creek water in the turbulent area just below the dam. The polyacrylamide employed was a commercial material (Separan AP-30) in which about 30 percent of the amide groups had been hydrolyzed to sodium carboxylate groups and which was characterized by a viscosity of about 25 centipoises for a 0.5 percent by weight solution thereof in aqueous 4 percent sodium chloride solution at a pH 7 and at a temperature of 25° C. The polymer solution was added in an amount to provide about 1 part by weight of polymer per million parts of water in the stream. Within 45 minutes after the initiation of treatment the growth of small flocs in the water 100 feet downstream from the turbulent mixing area was observed. On following the water downstream it could be seen that the flocs grew in size and began to settle out. Over a period of 3 hours the clarity of the water downstream from the treatment point continually improved from a point somewhat over 0.1 mile below the treatment point to a point 0.5 mile downstream from the treatment point. The latter point showed the maximum clarification with very clear water so that the bottom of the stream bed was easily visible. Further downstream the flowing water gradually picked up silt and returned to an equilibrium silt load so that at points 1 and 3 miles below the treatment point no change in turbidity was observed during the 8-hour treatment period.

*Example 5*

A large flume approximately 460 feet in length was constructed. The first 110 feet consisted of a U-shaped metal trough 10 inches wide and 20 inches deep. At the outlet of this trough the flume widened into an open wood-lined ditch which was 350 feet long, 2 feet wide and 3 feet deep. With a water flow of 600 gallons per minute through the flume the linear velocity of the water was 2.5 feet per second in the metal trough portion and 0.25 feet per second in the wider downstream section. Sacramento River water adjusted to a hardness of about 200 parts per million was pumped into the flume at a rate of 600 gallons per minute. A slurry containing 50 percent by weight of Pacheco silt in water was injected into the input stream to the flume to provide 1 percent suspended solids in said input stream. During any particular treatment constant flow through the flume was maintained until equilibrium was established in silt load along the wider portion of the flume. Equilibrium was determined when successive samples at the farthest downstream point of the flume showed no change in turbidity with time. Equilibrium was usually established in approximately 20 minutes. Under these conditions, it was found that the untreated silty water reached an equilibrium corresponding to a content of from 0.25 to 0.3 percent by weight of suspended solids after passing through the first 50 to 100 feet of the wider part of the flume. The content of solids in the water in the flume was determined from the turbidity of the water as shown by determination in a Klett-Summerson photoelectric colorimeter using a red filter. Turbidity readings were converted to content of suspended solids using a calibration curve obtained from readings with the same instrument on a series of known suspensions of the same silt.

A dilute aqueous solution of an acrylamide polymer (commercially available as Separan 2610) was introduced into the flume by spraying into the inlet area of the flume where turbulence was high. The high turbulence accomplished flash mixing of the polymer solution with the silt suspension. The amount of polymer solution was adjusted to provide 1.3 parts by weight of polymer per million parts of water. Introduction of the polymer solution was continued until the suspended solids in the flume had reached equilibrium. At that time samples taken at points 75 feet and 100 feet downstream in the wide portion of the flume showed contents of about 0.05 and 0.04 percent by weight of suspended solids respectively.

In further determinations similar to the above it was found that excellent deposition of silt could be obtained with various methods of introduction of the polymer either as a solution sprayed on the surface or pumped into the flowing stream or as dry powder introduced into the stream through a Venturi tube arrangement, provided that the introduction of the polymer was made in an area where there was sufficient turbulence to provide for rapid mixing of the polymer with the water. It was also found that the required turbulence could be introduced by placing baffles or weirs in the wide portion of the flume and introducing the polymer upstream from said obstructions.

*Example 6*

During the rainy season in the Panhandle area of Texas much run-off water collects in low spots in the relatively flat terrain to form shallow lakes locally known as playa lakes. Because of the nature of the soil in this area large amounts of mud and silt are carried into these lakes. The mud and silt settles only very slowly because of turbulence produced in the shallow lakes by wind. It is desirable to obtain clear water from these lakes for irrigation purposes and for replenishing depleted subterranean aquifers. Two of these lakes of approximately the same size located about 5 miles apart were selected for study. One lake was maintained untreated to serve as a control. The other lake was treated with 7 pounds of a partially hydrolyzed polyacrylamide (Separan AP-30) by dusting the dry polymer onto the surface of the lake from a crop dusting airplane. The commercial grade of the polymer was a dry, flaky material which had been ground to pass a 20 mesh screen. The material was dispersed onto the lake surface (estimated to be 4 to 5 acres in area) by the slipstream from the plane. On the day following the treatment the winds were very strong and a storm was brewing. Samples taken from the two lakes during this period of high turbulence showed 93 parts per million of suspended solids in the treated lake as compared to 369 parts per million of suspended solids in the untreated lake. Two days later after the winds had dropped to a more moderate level a sample from the treated lake contained only 36 parts per million of suspended solids as compared to 340 parts per million for a sample from the untreated lake.

When one or a plurality of the flocculants of the invention; that is, of the water-soluble polymers containing a plurality of polar groups, is added to a flowing, solids-containing stream, either as a dilute solution or as a solid, in the manner described above, the solids in the stream will be agglomerated and will settle to the stream bed. It is one of the advantages of this invention that the location where the solids will be deposited can be selected at will.

Thus, it is possible to deposit the solids in a place where they will not interfere with navigation or cause undesirable changes in the course of a stream. The invention further provides a method of taking advantage, if desired, of the natural tendency of streams to pick up solids until a kind of eqiuilibrium is reached. By using this invention to remove the solids from a stream at a certain point, the stream is induced to pick up solids further downstream, thus clearing the course of the stream at the downstream point. The flowing stream may be treated according to this invention just before it enters the sedimentation basins of irrigation systems and the solids in the stream will be almost completely removed from the water before it leaves the sedimentation basins. A corollary of this advantage of the invention is that future sedimentation basins may be much smaller and thus less expensive, but still will produce equal volumes of clear water. By using the invention to control the location of solids deposition a stream may be induced to give up its solids at a point in the reservoir behind a dam wherefrom the solids may be removed by mechanical means. Similarly the entire course of the stream may be used as a settling bed for the removal of solids before the stream enters the reservoir, thus greatly extending the life of the reservoir. If desired, the solids can be deposited behind a small dam upstream, from whence they can be removed continuously, thus preventing the solids from entering the main reservoir.

In a further embodiment, the invention provides a method of depositing a layer of solids on the bottom of a stream which is more resistant to erosion than the natural stream bottom. The solids so deposited are formed by the invention into flocs which settle to the bottom of the stream and which are resistant to the eroding action of the flowing water. If treatment is carried out at suitable intervals throughout the length of the stream, not only will the stream run substantially solids-free but its eroding action upon surrounding land will be materially reduced.

We claim:
1. A method which comprises the steps of (1) selecting an area of turbulence in a flowing water course containing suspended solids, wherein said water flows from said area of turbulence into a different geographic region of decreased turbulence; (2) distributing into said flowing water in said area of turbulence a flocculant consisting of at least one water-soluble high molecular weight synthetic organic polymer containing a plurality of polar groups along the polymer chain; and (3) thereby agglomerating and causing deposition of the so-agglomerated solids in said different geographic region of decreased turbulence.

2. A method according to claim 1 wherein the flocculant is distributed in the form of a dilute solution.

3. A method according to claim 1 wherein the flocculant is distributed in a dosage of from about 0.001 pound to 20 pounds per ton of suspended solids in the water being treated.

4. The method of claim 1 wherein the area of turbulence is created by introducing an artificial obstruction into said flowing water course.

5. The method of claim 1 wherein the flocculant is a polyacrylamide.

References Cited in the file of this patent

UNITED STATES PATENTS

| | | |
|---|---|---|
| 1,362,611 | Ellms | Dec. 21, 1920 |
| 1,893,451 | Smith | Jan. 3, 1933 |
| 2,345,827 | Olin | Apr. 4, 1944 |

FOREIGN PATENTS

| | | |
|---|---|---|
| 163,501 | Australia | June 22, 1955 |
| 163,502 | Australia | June 22, 1955 |
| 761,021 | Great Britain | Nov. 7, 1956 |

OTHER REFERENCES

"Handbook of Applied Hydraulics," McGraw-Hill Book Company, Inc., New York (1952), pages 970–977.

"Industrial and Engineering Chemistry" (periodical), vol. 46, No. 7, article by Michaels, pages 1485–1490, July 1954.

McCarty et al.: "Mining Engineering," vol. 11, No. 1, pages 61–65, January 1959.

"USBR's Lower-cost Canal Lining Program," Wilson, J. of the Irrigation and Drainage Division, Proceedings of the Amer. Soc. of Civil Engineers, April 1958, pages 1589–1 to 1589–30.